(12) United States Patent
Lee et al.

(10) Patent No.: US 10,257,011 B2
(45) Date of Patent: *Apr. 9, 2019

(54) PREAMBLE CONFIGURING METHOD IN THE WIRELESS LAN SYSTEM, AND A METHOD FOR A FRAME SYNCHRONIZATION

(71) Applicant: Electronics and Telecommunications Research Institute, Daejeon (KR)

(72) Inventors: Woo-Yong Lee, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/686,656

(22) Filed: Aug. 25, 2017

(65) Prior Publication Data

US 2018/0006865 A1 Jan. 4, 2018

Related U.S. Application Data

(63) Continuation of application No. 13/491,941, filed on Jun. 8, 2012, now Pat. No. 9,769,002, which is a
(Continued)

(30) Foreign Application Priority Data

Dec. 27, 2003 (KR) .................. 10-2003-0098211

(51) Int. Cl.
*H04L 27/26* (2006.01)
*H04W 56/00* (2009.01)
(Continued)

(52) U.S. Cl.
CPC ............ *H04L 27/2656* (2013.01); *H04L 7/10* (2013.01); *H04L 25/0202* (2013.01);
(Continued)

(58) Field of Classification Search
CPC ... H04L 29/0653; H04L 25/0202; H04L 7/10; H04L 27/2628; H04L 27/2634; H04L 27/2656; H04L 27/2663; H04W 56/001
See application file for complete search history.

(56) References Cited

U.S. PATENT DOCUMENTS 5,164,942 A 11/1992 Kamerman et al.
6,363,107 B1 3/2002 Scott
(Continued)

FOREIGN PATENT DOCUMENTS

EP 1313283 5/2003
EP 1317094 6/2003
(Continued)

OTHER PUBLICATIONS

International Search Report dated Mar. 24, 2005 for PCT/KR2004/003471.
(Continued)

*Primary Examiner* — Ashley Shivers
(74) *Attorney, Agent, or Firm* — NSIP Law

(57) ABSTRACT

A method of configuring a preamble of a downlink frame for synchronization in data frame transmission of a 60 GHz wireless local area network system, the method comprising arranging a short preamble having a plurality of repetitive S symbols, and an IS symbol, and arranging a long preamble having a long cyclic prefix (CP) and a plurality of L symbols for frame synchronization and symbol timing by performing auto-correlation according to the length of window of the auto-correlation.

2 Claims, 24 Drawing Sheets

Related U.S. Application Data continuation of application No. 10/584,335, filed as application No. PCT/KR2004/003471 on Dec. 27, 2004, now Pat. No. 8,218,427.

(51) Int. Cl.
*H04L 7/10* (2006.01)
*H04L 25/02* (2006.01)
*H04W 84/12* (2009.01)

(52) U.S. Cl.
CPC ...... *H04L 27/2613* (2013.01); *H04L 27/2628* (2013.01); *H04L 27/2662* (2013.01); *H04L 27/2663* (2013.01); *H04W 56/001* (2013.01); H04L 25/0226 (2013.01); H04L 27/2607 (2013.01); H04W 84/12 (2013.01)

(56) References Cited

U.S. PATENT DOCUMENTS

| | | |
|---|---|---|
| 6,590,881 B1 | 7/2003 | Wallace et al. |
| 6,696,879 B1 | 2/2004 | O'Toole et al. |
| 7,154,975 B1 | 12/2006 | Bohnke et al. |
| 7,158,541 B2 | 1/2007 | Sawada et al. |
| 7,336,738 B2 | 2/2008 | Wakamatsu |
| 7,415,080 B2 | 8/2008 | Echavarri et al. |
| 2002/0159533 A1* | 10/2002 | Crawford ............ H04L 27/2657 375/260 |
| 2003/0161428 A1 | 8/2003 | Garrett et al. |
| 2004/0004933 A1 | 1/2004 | Zhu et al. |
| 2004/0076246 A1 | 4/2004 | Vanderperren et al. |
| 2004/0165683 A1 | 8/2004 | Gupta et al. |
| 2005/0135432 A1 | 6/2005 | Kelley et al. |
| 2005/0233709 A1 | 10/2005 | Gardner et al. |
| 2006/0050802 A1 | 3/2006 | Kim et al. |

FOREIGN PATENT DOCUMENTS

| | | |
|---|---|---|
| JP | 2001-217802 | 8/2001 |
| JP | 2001-237816 | 8/2001 |
| JP | 2003-060649 | 2/2003 |
| JP | 2003-069546 | 3/2003 |
| JP | 2003-143106 | 5/2003 |

OTHER PUBLICATIONS

International Search Report for PCT/KR2004/003471, citing the above reference(s).

Japanese Office Action for 2006-546838, citing the above reference(s).

Mario Huemer et al., "Unique word based phase tracking algorithms for SC/FDE-systems", IEEE Global Telecommunications Conference—Globecom'03, vol. 1, Dec. 5, 2003, pp. 70-74.

Office Action dated Nov. 25, 2008, for Japanese application No. 2006-546838.

Sridhar Nadula et al., "Robust timing synchronization for ofdm based wireless lan system". IEEE Conference on Convergent Technologies for the Asia-Pacific Region—Tencon 2003, vol. 4, Oct. 15, 2003, pp. 1558-1561.

U.S. Appl. No. 60/461,999, Modified Preamble Structure for IEEE 802.11A Extensions, Gardner et al., Apr. 10, 2003, [0001].

Vicenc Almenar et al.,; Synchronization Techniques for HIPERLAN/2; IEEE; 2001; pp. 762-766.

Woojong Rhee et al.; "Increase in Capacity of Multiuser OFDM System Using Dynamic Subchannel Allocation"; IEEE; 2000; pp. 1085-1089.

* cited by examiner

FIG. 5

| parameter | value |
|---|---|
| $T_P$ : PLCP Preamble Period | 6.8μs (= $T_{SP}$ + $T_{LP}$) |
| $T_{CP}$ : Cycle prefix period | 0.133μs (= $T_U$ /16) |
| $T_{SHORT}$ : Short training sequence period | 2.27μs |
| $T_{LONG}$ : Long training sequence period | 4.53μs |

FIG. 23

| channel | method 1 | | | method 2 (detection range) | | |
|---|---|---|---|---|---|---|
| | Threshold | FA | DF | Threshold | FA | DF |
| AWGN | 0.65 | 2.000*10⁻⁴ | <2.000*10⁻⁴ | 0.60 | 2.800*10⁻³ | <2.000*10⁻⁴ |
| LOS | | <2.000*10⁻⁴ | <2.000*10⁻⁴ | | 2.800*10⁻³ | <2.000*10⁻⁴ |
| NLOS | | 8.000*10⁻⁴ | <2.000*10⁻⁴ | | 2.600*10⁻³ | <2.000*10⁻⁴ |

FIG. 24

| channel | method 1 | | | method 2 (detection range) | | |
|---|---|---|---|---|---|---|
| | Threshold | FA | DF | Threshold | FA | DF |
| AWGN | 0.65 | 2.000*10⁻⁴ | <2.000*10⁻⁴ | 0.60 | 4.000*10⁻⁴ | <2.000*10⁻⁴ |
| LOS | | <2.000*10⁻⁴ | <2.000*10⁻⁴ | | 4.000*10⁻⁴ | <2.000*10⁻⁴ |
| NLOS | | 8.000*10⁻⁴ | <2.000*10⁻⁴ | | 4.000*10⁻⁴ | <2.000*10⁻⁴ |

PREAMBLE CONFIGURING METHOD IN THE WIRELESS LAN SYSTEM, AND A METHOD FOR A FRAME SYNCHRONIZATION

CROSS REFERENCE TO RELATED APPLICATIONS

This application is a continuation of U.S. patent application Ser. No. 13/491,941 filed on Jun. 8, 2012, now U.S. Pat. No. 9,769,002 issued Sep. 19, 2017, which is a Continuation of U.S. patent application Ser. No. 10/584,335 having a 371(c) date of Jun. 23, 2006, now U.S. Pat. No. 8,218,427 issued Jul. 10, 2012, which is a U.S. National Stage application of International Application No. PCT/KR2004/003471, filed on Dec. 27, 2004, which claims priority to Korean Patent Application No. 10-2003-98211 filed on Dec. 27, 2003 in the Korean Intellectual Property Office, the entire disclosures of which are incorporated herein by reference for all purposes.

BACKGROUND OF THE INVENTION

Field of the Invention

The present invention relates to a preamble configuring method and a frame synchronization detection method in a wireless local area network system, and more particularly it relates to a preamble configuring method and a detection method for data frame synchronization in a 60 GHz wireless local area network system.

Description of the Related Art

During data frame transmission in a conventional wireless local area network (WLAN) system, a preamble signal is transmitted to a receiver at the beginning of the data frame and the receiver detects the start of frame transmission and performs a symbol timing detection for demodulation using the preamble signal.

Methods for detecting the symbol timing, an auto-correlation or a cross-correlation of a received signal may be employed.

The cross-correlation requires lots of calculations in every clock period and may cause serious performance degradation due to a carrier frequency offset, whereas the auto-correlation requires less calculations and can be simply implemented.

"Synchronization Technique for HIPERLAN/2" (IEEE 54th Vehicular Technology Conference, vol. 2, p. 762~766, 2001, by V. Almenar) is related to a method for detecting frame synchronization by using the phase and amplitude of auto-correlation in a 5 GHz OFDM (Orthogonal Frequency Division Multiplexing) WLAN system.

However, the above-disclosed transaction may not be available for estimating carrier frequency offset in a 60 GHz WLAN system.

SUMMARY OF THE INVENTION

It is an object of the present invention to provide a method for frame synchronization detection for a 60 GHz wireless local area network (WLAN) system for efficiency of performance and realization.

It is another object of the present invention to provide a method for configuring a downlink physical layer preamble and an uplink physical layer preamble for the 60 GHz WLAN system.

It is another object of the present invention to provide a method for configuring preambles and detecting frame synchronization by using periodically repeated preambles and auto-correlation to enhance performance and simplify complexity of realization.

In one aspect of the present invention, there is provided a method for configuring a preamble of a downlink frame for synchronization and channel estimation in a wireless local area network system. The method comprises a) arranging a short preamble at starting points of an uplink burst and a downlink burst and b) arranging a long preamble used for fine frequency offset estimation and channel estimation in the receiver after the short preamble. The short preamble is used for time and frequency synchronization in a receiver. In a), a plurality of S symbols are repetitively arranged in the starting points of the uplink burst and the downlink burst, and an IS symbol is arranged after the S symbols. In b), a long cyclic prefix (CP) is arranged after the short preamble, and a plurality of L symbols are repetitively arranged after the long CP.

In another aspect of the present invention, there is provided a method for detecting synchronization of data transmitted per frame in a wireless local area network system, the frame comprising a short preamble having a plurality of repetitive S symbols, and an IS symbol. In the method, frame synchronization of a short preamble in a form of a periodically repeated signal is detected according to a characteristic of auto-correlation of the short preamble, and timing is estimated by performing auto-correlation according to windows having lengths set to have different periods.

BRIEF DESCRIPTION OF THE DRAWINGS

The accompanying drawings, which are incorporated in and constitute a part of the specification, illustrate an embodiment of the invention, and, together with the description, serve to explain the principles of the invention.

FIG. 5 depicts parameters of the preamble in a time domain for the 60 GHz WLAN system according to the embodiment of the present invention.

FIG. 23 shows a table for comparing a frame synchronization algorithm using an auto-correlation window of a sufficient length (first method) with a frame synchronization including the timing estimation process (second method) when the detection range is equally set to be 16 samples and a signal-to-noise ratio (SNR) is set to be 5 dB according to the present invention.

FIG. 24 shows a table comparing the first method and the second method when the detection range is equally set to be 64 samples and the SNR is set to be 5 dB according to the embodiment of the present invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Referring to the accompanying drawings, methods for configuring a preamble and detecting frame synchronization in a wireless local area network (WLAN) system according to the embodiment of the present invention will be described in detail.

In a typical communication system, a transmitter transmits a preamble or a training signal to a receiver to pre-notify data frame transmission before the actual data frame is transmitted. The receiver therefore perceives that the actual data frame will be transmitted by receiving the preamble or the training signal.

According to embodiments of the present invention, a downlink physical layer preamble and an uplink physical layer preamble are implemented, and methods for detecting start of data frame transmission by employing auto-correlation of periodic and continuous preamble signals and detecting frame synchronization by using the phase and amplitude of the auto-correlation are provided. The frame synchronization detection includes timing estimation to enhance timing accuracy.

In the embodiments of the present invention, the frame synchronization algorithm is employed because the 60 GHz WLAN system supports the orthogonal frequency division multiplexing (OFDM)/time division duplex (TDD) system. When a synchronization algorithm employed in a HIPERLAN/2-based system is applied to carrier frequency offset of ±5.12 of the 60 GHz WLAN system, phase variation becomes 2π×5.12×16(window delay)/256(FFT size)=0.64π thus exceeding π/2, and it is accordingly difficult to distinguish an upper link and a lower link in the 60 GHz WLAN system. For the same reason, a pre-compensation method is used without considering a short preamble of the upper link.

There are two types of physical layer bursts in the 60 GHz WLAN system: a downlink (DL) burst and an uplink (UL) burst. Protocol data unit (PDU) trains input to an upper layer are added with preambles for synchronization and channel estimation and mapped into the physical layer (PHY) bursts.

Figure 1:
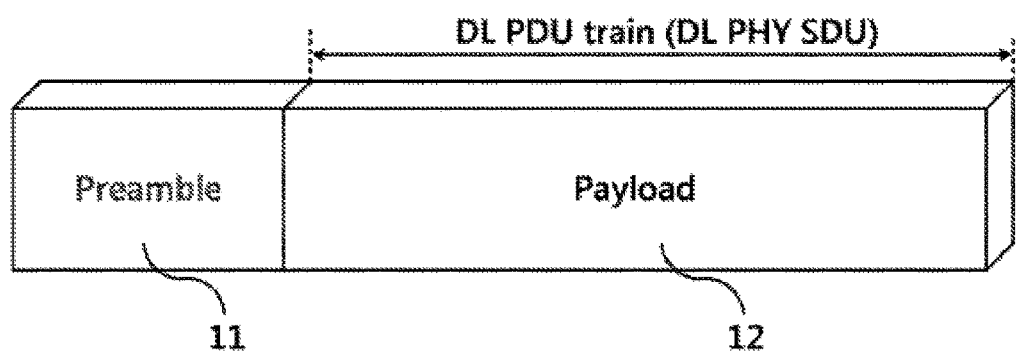
FIG. 1 illustrates a downlink protocol data unit (PDU) train for a 60 GHz wireless LAN (WLAN) system according to the embodiment of the present invention.

FIG. 1 illustrates a DL PDU train for the 60 GHz WLAN system according to an exemplary embodiment of the present invention. The DL PDU train includes a preamble 11 and a payload 12. The DL PDU train is mapped to the DL PHY burst which is generated by adding the preamble 11 to a plurality of baseband OFDM symbols.

Figure 2:
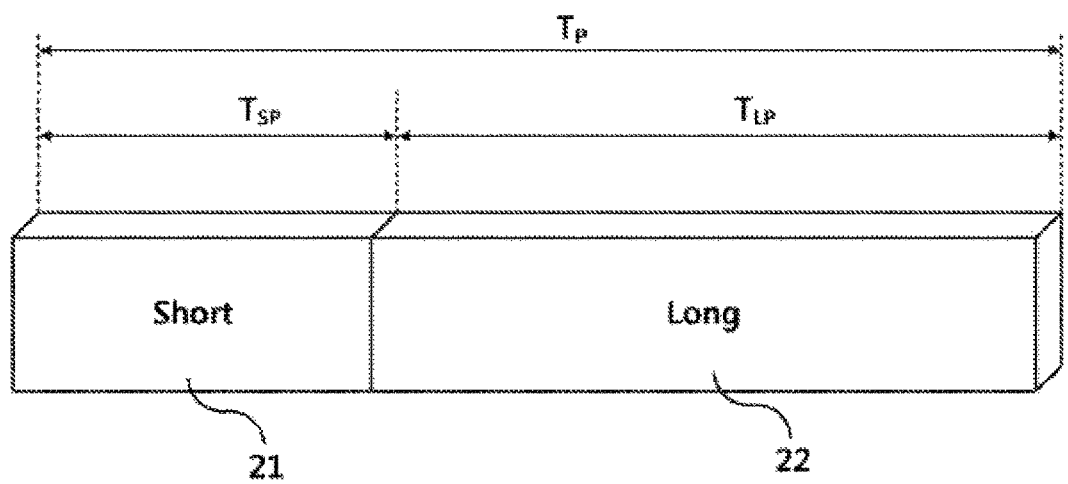
FIG. 2 illustrates a structure of a downlink preamble for the 60 GHz wireless LAN (WLAN) system according to the embodiment of the present invention.

FIG. 2 illustrates a structure of a DL preamble for the 60 GHz WLAN system according to an exemplary embodiment of the present invention. The DL preamble has the length of $T_P$, and includes a short preamble 21 having the length of $T_{sp}$ and a long preamble 22 having the length of $T_{LP}$. The short preamble 21 is used by the receiver for time and frequency synchronization.

Figure 3:
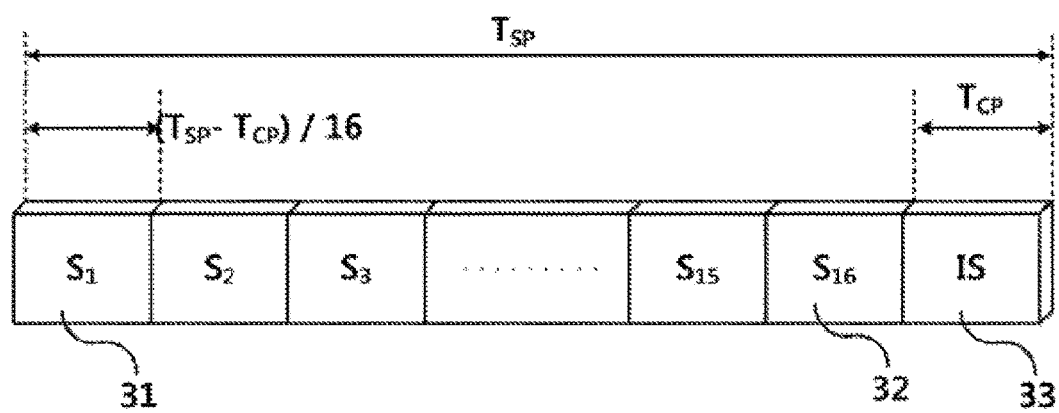
FIG. 3 depicts a structure of a short preamble in the time domain for the 60 GHz WLAN system according to the embodiment of the present invention.

FIG. 3 illustrates a structure of the short preamble in a time domain of the 60 GHz WLAN system according to an exemplary embodiment of the present invention. The short preamble has S symbols 31 and 32 that are repeated 16 times within a data symbol period, and an IS symbol 33 having the length of a guard interval (hereinafter, referred to as cyclic prefix CP). There is a 180° phase difference between the S symbol and the IS symbol.

A frequency domain signal of the short preamble is given as Equation 1. Herein, a time domain signal of the short preamble is formed by adding the IS symbol to a signal that is an Inverse Fast Fourier Transform (IFFT) processed frequency domain signal.

$$SP_k = \begin{cases} \sqrt{200/24} \times (C^4_{1,m+1} + jC^4_{8,m+1}), & \begin{array}{l} k = 16 \times m, \\ 0 \leq m < 6 \end{array} \\ \sqrt{200/24} \times (C^4_{1,m+1} + jC^4_{8,m+1}), & \begin{array}{l} k = 16 \times (m+1) + 4, \\ 6 \leq m \leq 11 \end{array} \\ 0, & \text{otherwise} \end{cases}$$ [Equation 1]

Where $\sqrt{200/24}$ is a normalized power value resulted from using 12 sub-carriers among 200 sub-carriers, $C^4_{8,m}$ is calculated by inverting 0 into −1 in a matrix generated by an m-sequence generator of a fourth-degree polynomial $x^4+x+1$, and s is an initial value.

Figure 4:
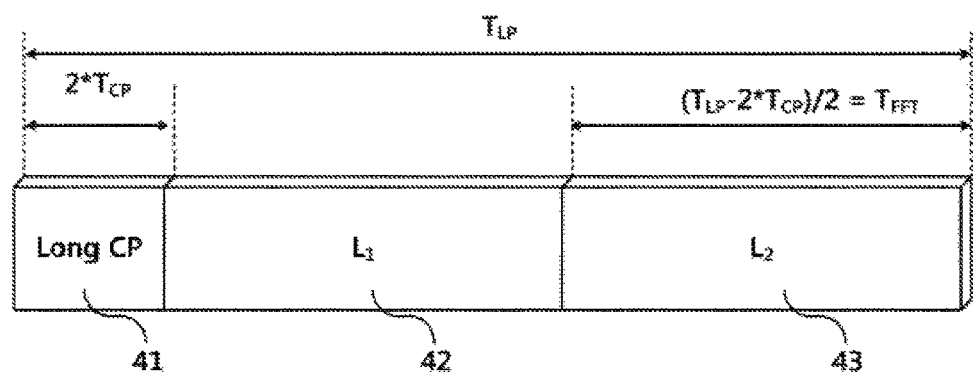
FIG. 4 depicts a structure of a long preamble in the time domain for the 60 GHz WLAN system according to the embodiment of the present invention.

FIG. 4 illustrates a structure of a long preamble in the time domain of the 60 GHz WLAN system. The long preamble having the length of $T_{LP}$ is used by the receiver for fine frequency offset estimation and channel estimation. The long preamble includes two L symbols 42 and 43 respectively having the length of $T_{LP}$ and a long CP 41. The length of the L symbol is twice as long as that of the data symbol period, and the length of the long CP 41 is twice as long as that of the CP of the IS symbol 33.

A frequency domain signal of the long preamble is given as Equation 2. Herein, a time domain signal of the long preamble is formed by inserting a signal and the long CP 41 that is twice as long as the CP of the IS symbol 33, the signal being generated by the IFFT-processing the frequency domain signal and repeating the IFFT processed frequency domain signal twice.

$$LP_k = \begin{cases} C^8_{1,m+11}, & \text{if } k \neq 100 \\ 0, & \text{if } k = 100 \end{cases}, 0 \leq k < 200 \quad \text{[Equation 2]}$$

Where $C_{8,m}^8$ is calculated by inverting 0 into −1 in a matrix generated from an m-sequence generator of an eight-degree polynomial $x^8+x^7+x^6+x+1$, and s denotes an initial value.

FIG. 5 illustrates parameters of the preamble in the time domain of the 60 GHz WLAN system. Each wireless terminal (WT) estimates a carrier frequency by using a DL preamble of a DL sub-frame and maintains the UL carrier frequency offset within 1% of a difference between the sub-carrier frequencies since the uplink (UL) burst has no periodical UL preamble. Further, adequate transmission power for the UL is derived from average transmission power of an access point (AP) estimated by the DL preamble. In other words, the UL signal transmitted to the AP does not require carrier frequency restoration and automatic gain control (AGC) processes, and the estimated carrier frequency offset is small, such that the CP is used to estimate symbol timing.

The frame synchronization is used to find the start point of each frame and estimate the frame timing for fine symbol timing estimation. Frame synchronization performance is defined by referring to the following criteria: timing accuracy, false alarm (FA), and detection failure probability (DF). Herein, the timing accuracy and the false alarm are regarded as one criterion. The frame synchronization is affected by the length of an auto-correlation window. However, a detection range is controlled to correspond to the length of the window when referring to the criteria for the frame synchronization.

Figure 6:
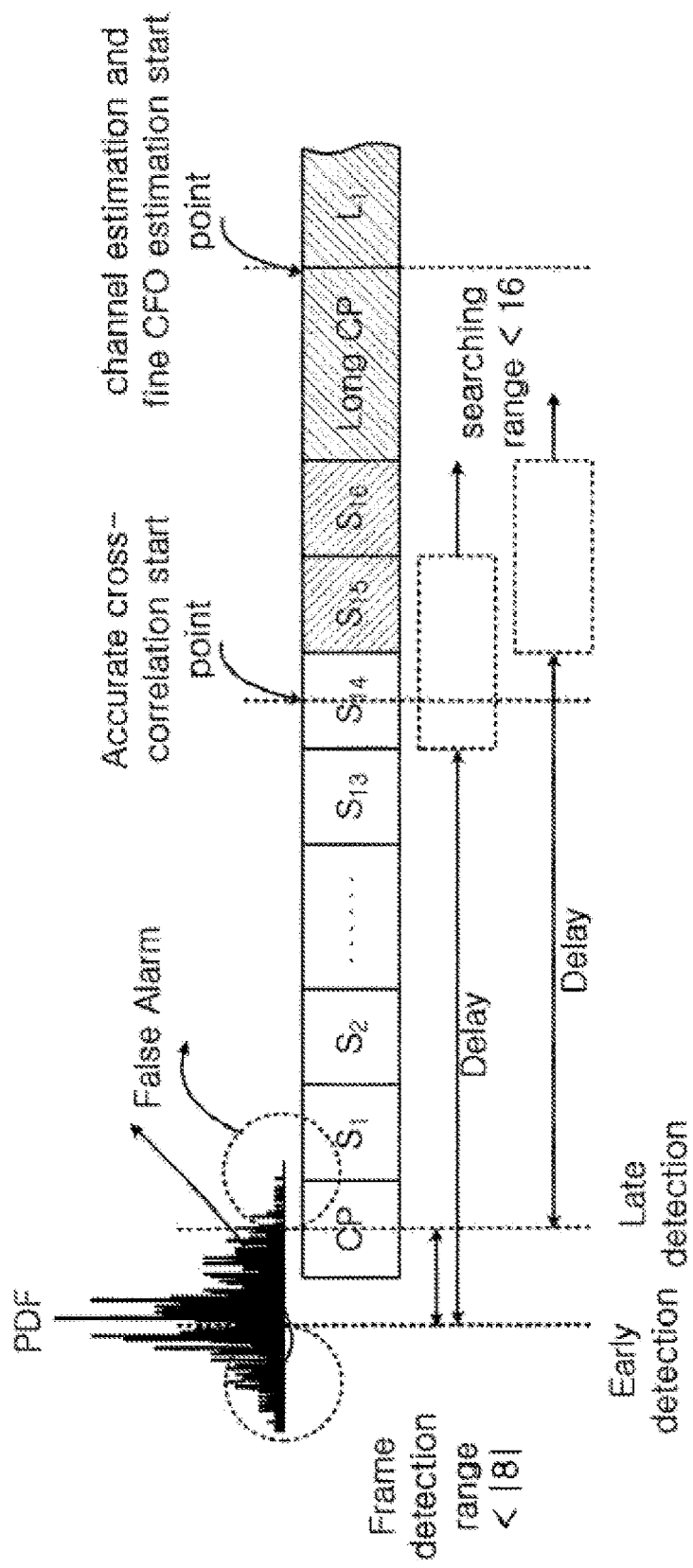
FIG. 6 depicts a frame synchronization estimation process in the case that a cyclic prefix is inserted instead of an IS symbol in the short preamble for the 60 GHz WLAN system according to the embodiment of the present invention.
Figure 7:
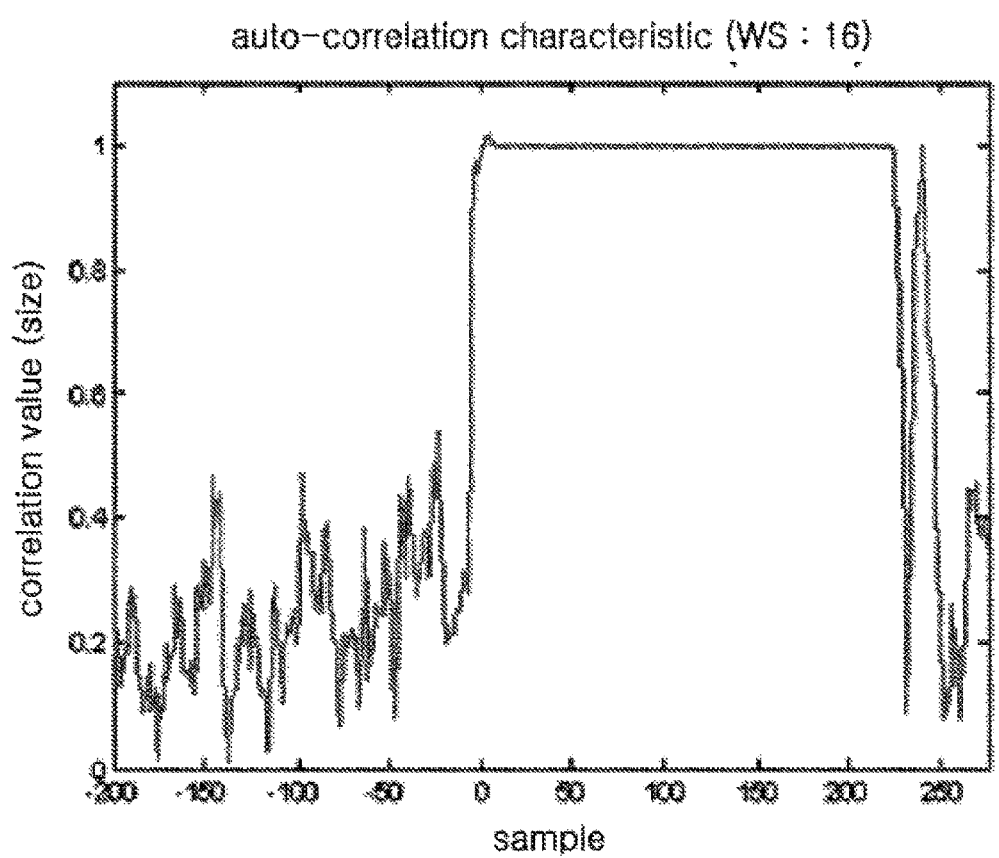
FIG. 7 to FIG. 10 depict auto-correlation specified by the length of a window during frame synchronization performance for the 60 GHz WLAN system according to the embodiment of the present invention.
Figure 8:
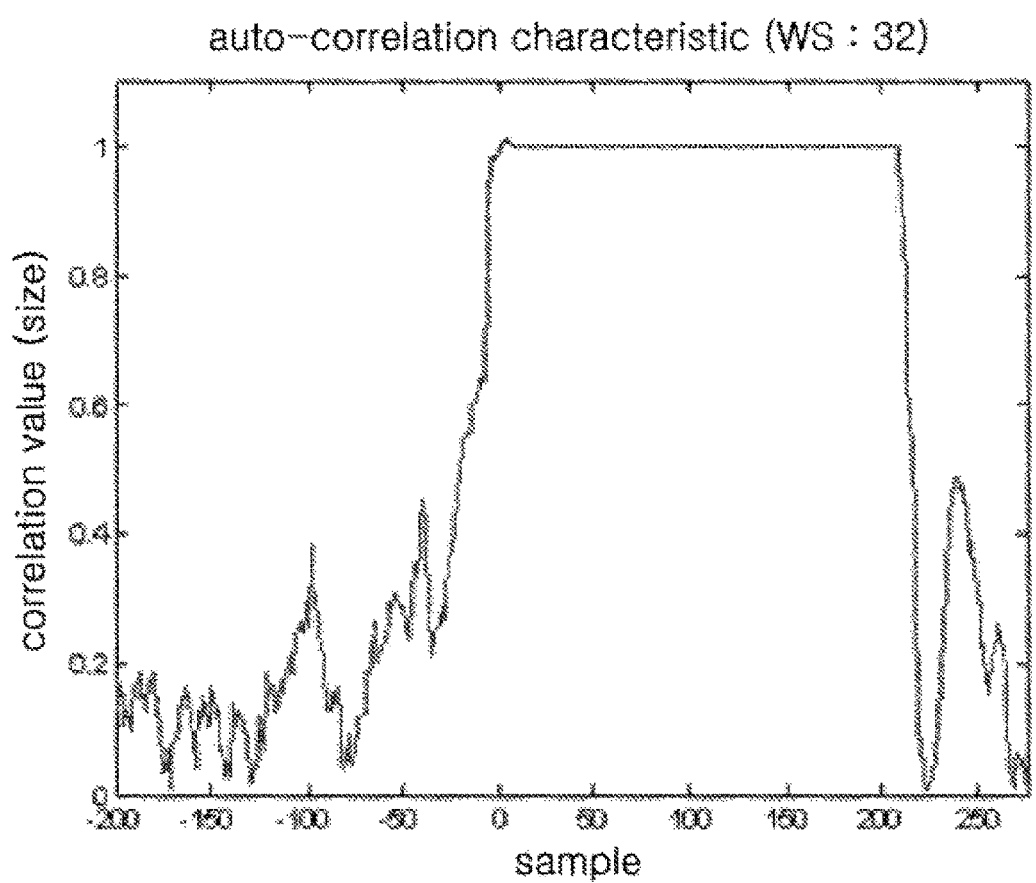
Figure 9:
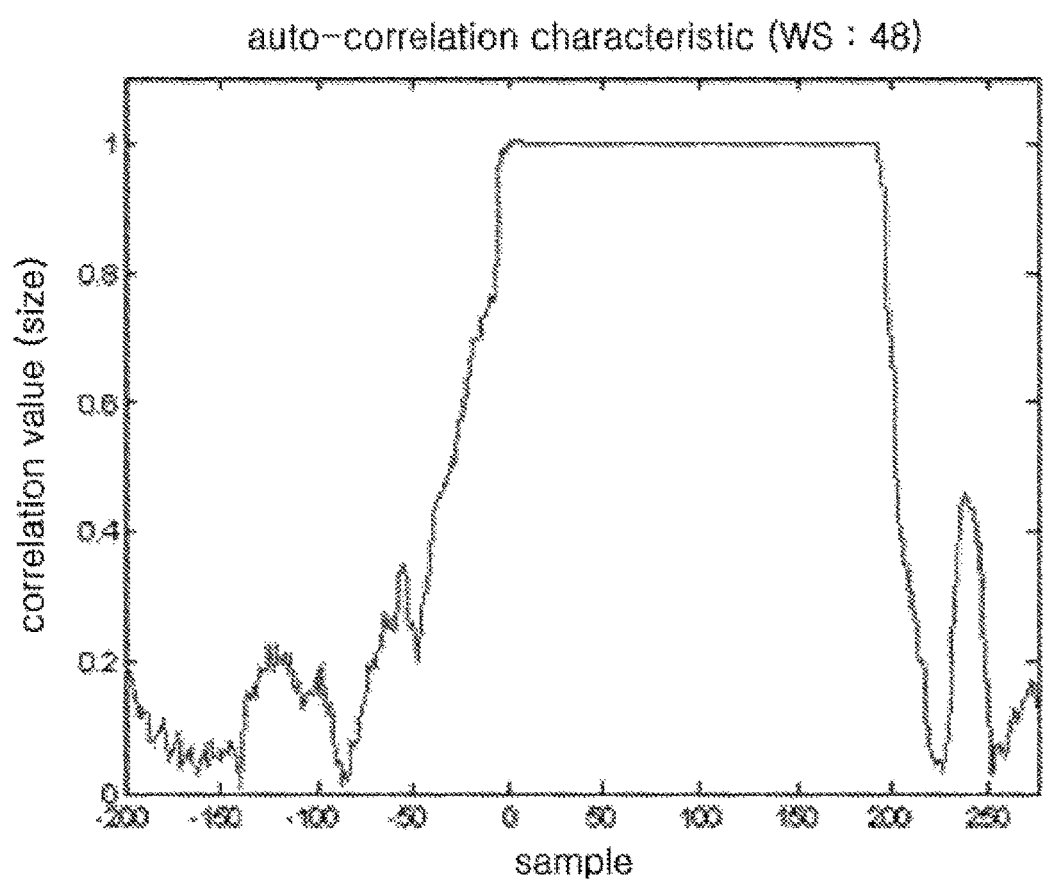
Figure 10:
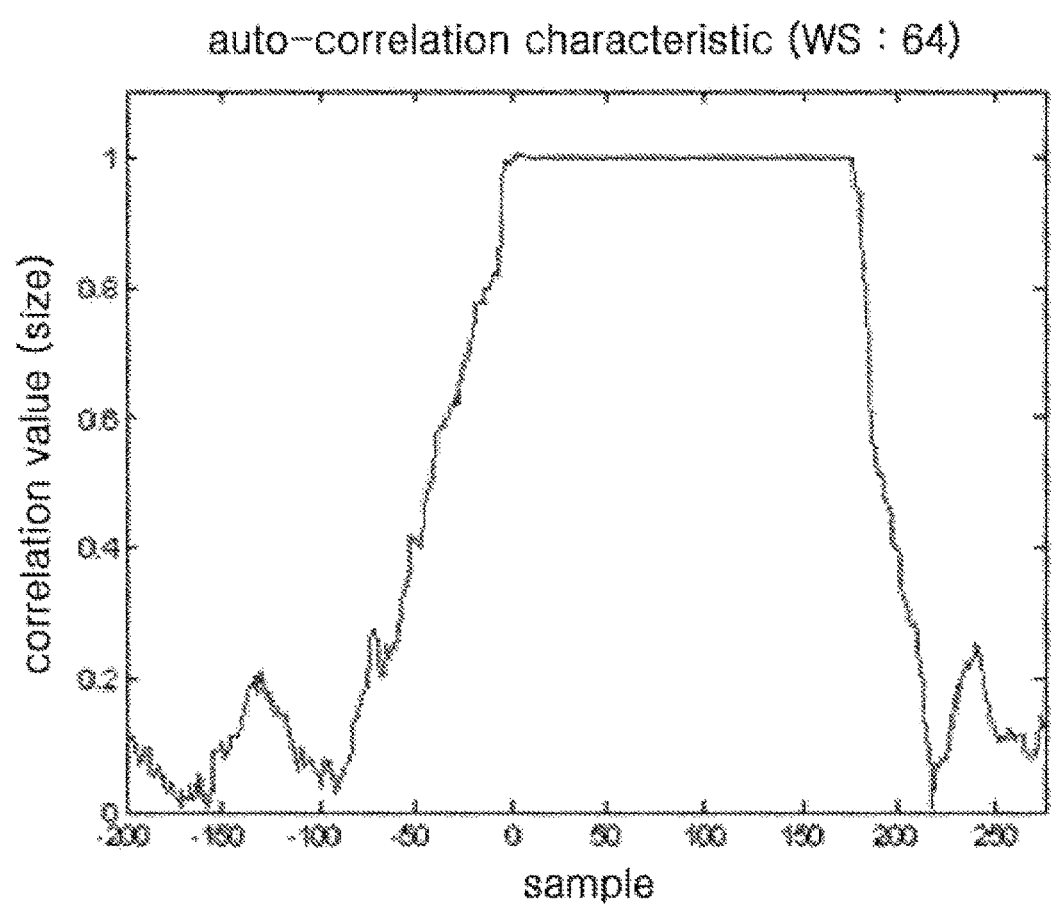

FIG. 6 depicts a process of the frame synchronization estimation when the CP is inserted to the short preamble instead of inserting the IS symbol thereto in the 60 GHz WLAN system according to the exemplary embodiment of present invention.

As shown therein, when n number of $S_m(S_{15}, S_{16})$ symbols are used for the fine symbol timing estimation, a performance range of the cross-correlation is set to be within 16 samples. Accordingly, the detection range of the frame synchronization is set within ±8 samples from a start point of the corresponding preamble. When the length of the auto-correlation window is set to be greater than 16 samples, start of the frame may be found within the preamble but the detection range may not satisfactory, thereby causing an increase of an FA. In other words, timing accuracy may cause performance degradation.

FIG. 7 to FIG. 10 respectively show length-specified auto-correlation when performing the frame synchronization in the 60 GHz WLAN system according to the present invention.

Referring to FIG. 7 to FIG. 10, the frame may not be synchronized because a peak difference between the first peak and the second peak is less than −6 dB when the length of the window is less than 16 samples and a signal-to-noise ratio is set to be zero.

Thus, a first method is proposed to solve the foregoing problem by using an auto-correlation window of sufficient length to extend the detection range.

In the first method using the auto-correlation window of a sufficient length, a received signal is delayed by an auto-correlation delay $N_{Delay}$, the received signal is multiplied by a conjugate complex of the delayed signal, a result of the multiplication is stored in a shift register having a window length of $N_{WS}$, and an average value of results stored in the shift register is calculated to thus detect a threshold value, find a maximum position, and detect the symbol timing.

Figure 11:
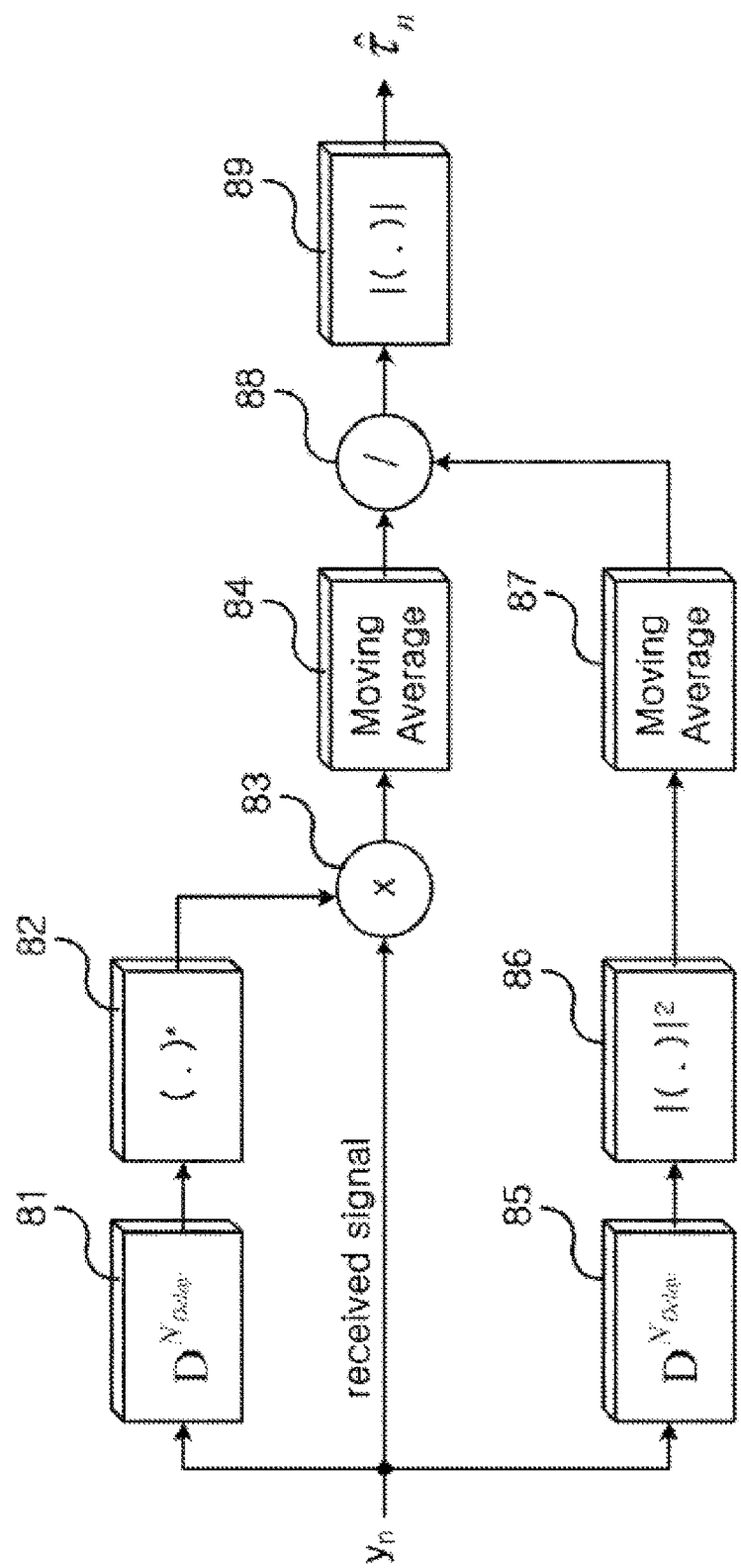
FIG. 11 explains a method of symbol timing estimation using auto-correlation according to the embodiment of the present invention.

FIG. 11 illustrates a process of symbol timing detection using the auto-correlation according to the present invention, and FIG. 11 and Equation 3 summarize a process of the method.

A multiplication result 83 of a received signal $y_n$ and a signal $y_{n-N_{Delay}}$ 82 becomes an input of a moving average block 84. Herein, the signal $y_{n-N_{Delay}}$ is a signal that is delayed by an $N_{Delay}$ sample 81 and converted into a conjugate complex 82. A square value 86 of the received signal that is delayed by the $N_{Delay}$ sample 85 is also input to a moving average block 87 to calculate an average value 89 to thereby obtain a final value $\hat{\tau}_n$. The final value $\hat{\tau}_n$ corresponding to a correlation coefficient is obtained by Equation 3.

$$\hat{\tau}_n = \frac{\left|\sum_{i=0}^{N_{WS}-1} y_{k-i} y^*_{k-N_{Delay}-i}\right|}{\sum_{i=0}^{N_{WS}-1} \left|y^*_{k-N_{Delay}-i}\right|^2} \quad \text{[Equation 3]}$$

Herein, it is determined that a desired signal is received when the correlation coefficient $\hat{\tau}_n$ is greater than the threshold value.

Figure 12:
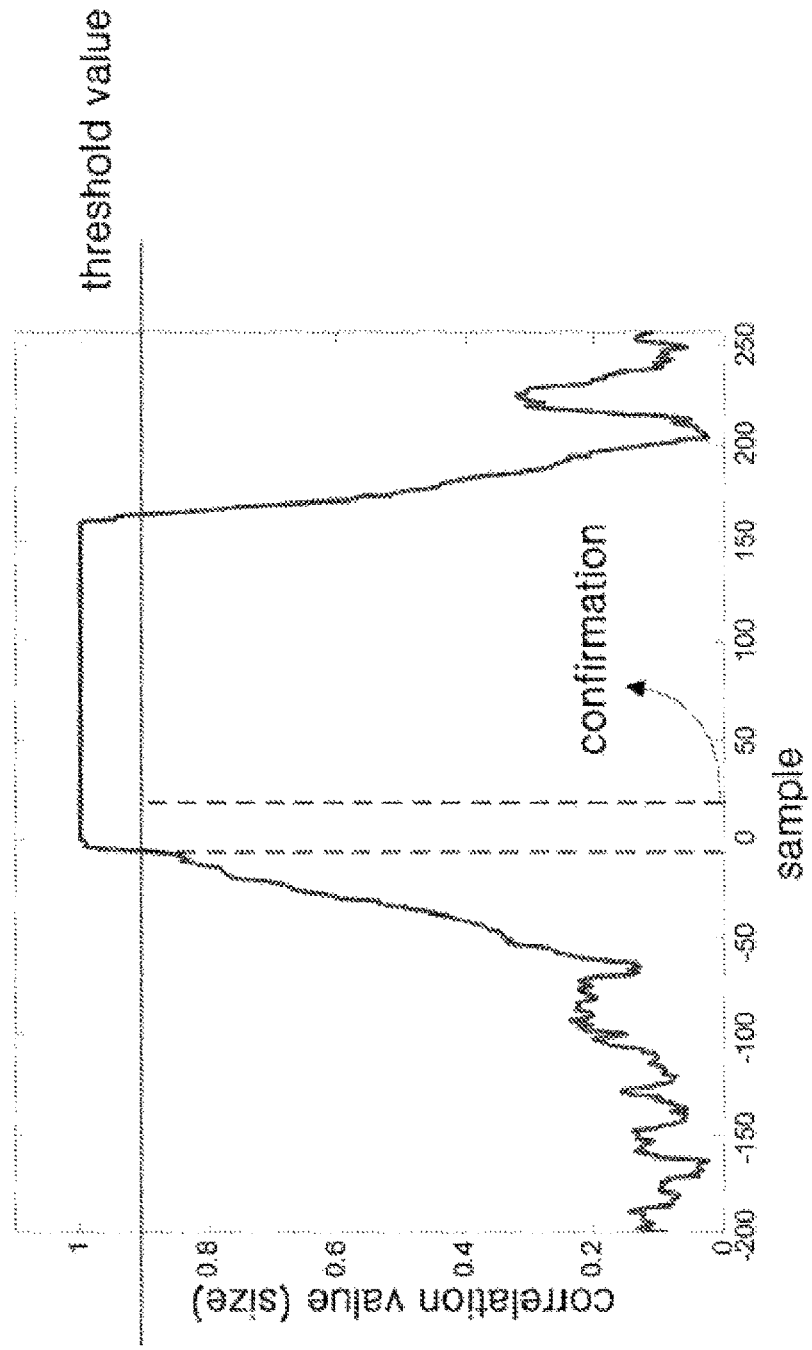
FIG. 12 explains a symbol timing detection process, separately including auto-correlation to reduce the probability of a false alarm (FA).

FIG. 12 illustrates a symbol timing detection including an additional auto-correlation designed to reduce the probability of an FA according to the present invention.

As shown therein, a confirmation process is repeated once to reduce the probability of an FA. Herein, a final value $\hat{\tau}_{n-confirm}$ corresponding to the correlation coefficient for confirmation is obtained by Equation 4.

$$\hat{\tau}_{n-confirm} = \frac{\left|\sum_{i=0}^{N_{WS}-1} y_{k-i} y^*_{k-N_{Delay}-N_{confirm}-i}\right|}{\sum_{i=0}^{N_{WS}-1} \left|y^*_{k-N_{Delay}-N_{confirm}-i}\right|^2} \quad \text{[Equation 4]}$$

Figure 13:
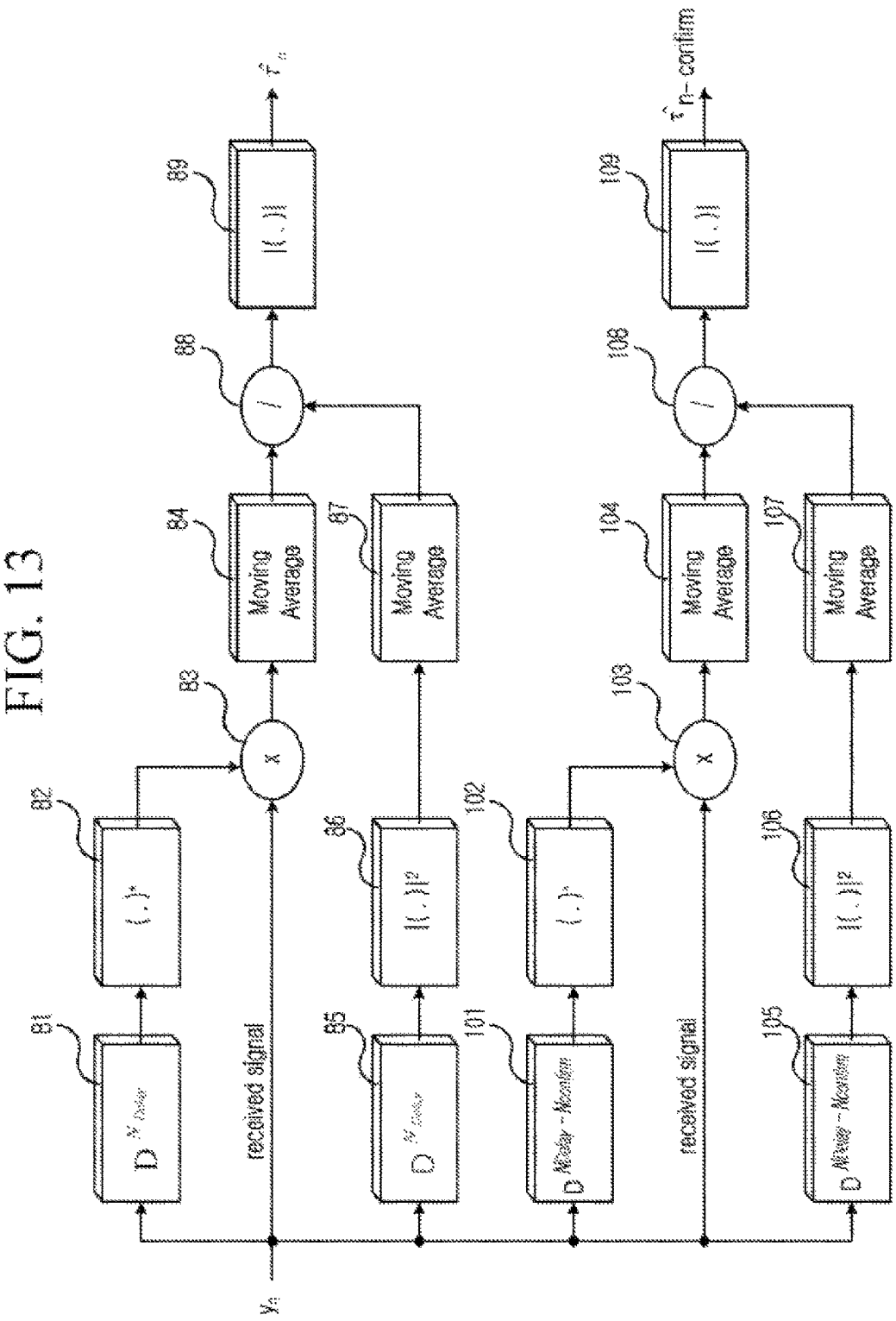
FIG. 13 depicts a symbol timing detection process including auto-correlation for confirmation according to the embodiment of the present invention.

FIG. 13 illustrates a process of symbol timing detection including the auto-correlation for the confirmation process according to the present invention. The process of the symbol timing detection of FIG. 13 is similar to that of FIG. 11, except blocks 101 and 106 for confirmation of the auto-correlation, and a detailed description thereof will thus be omitted.

As described, the first method proposes to use a window of sufficient length to reduce the probability of DF and FA, which however increases complexity of realization on the first method. Therefore, a process of timing detection is added to the frame synchronization process to increase timing accuracy in a second method of the present invention. For example, an auto-correlator having a window length of N samples is used to find the start point of the frame, find the highest peak of the auto-correlation within the N samples and accordingly increase the timing accuracy within ±8 samples.

Figure 14:
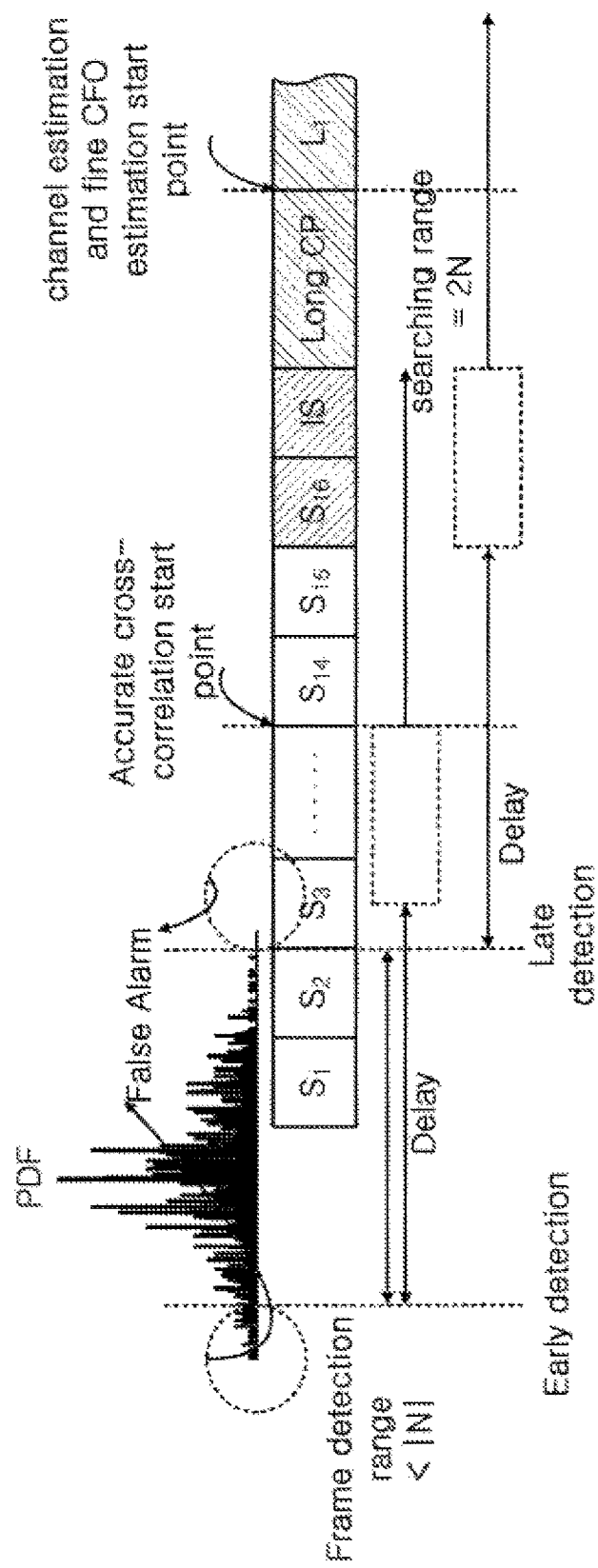
FIG. 14 explains a frame synchronization process in the case that the IS symbol is inserted instead of the CP symbol in the short preamble of the 60 GHz WLAN system according to the embodiment of the present invention.

FIG. 14 is a preamble structure designed for the first method. It illustrates a process of frame synchronization when inserting the IS symbol instead of inserting the CP symbol in the short preamble of the 60 GHz WLAN system according to the present invention. When the IS symbol is inserted at the last period having the CP length in the time domain and the fine symbol timing estimation employing the cross-correlation is performed thereon by using $S_{16}$ and the IS symbol, the corresponding performance overcomes the restriction of the detection range, and the detection range and the length of the auto-correlation window can be set without restriction.

However, a calculation amount of a cross-correlator must be considered since a computation period (2×|N|) of the cross-correlation is increased as a detection range (±N) is increased.

Figure 15:
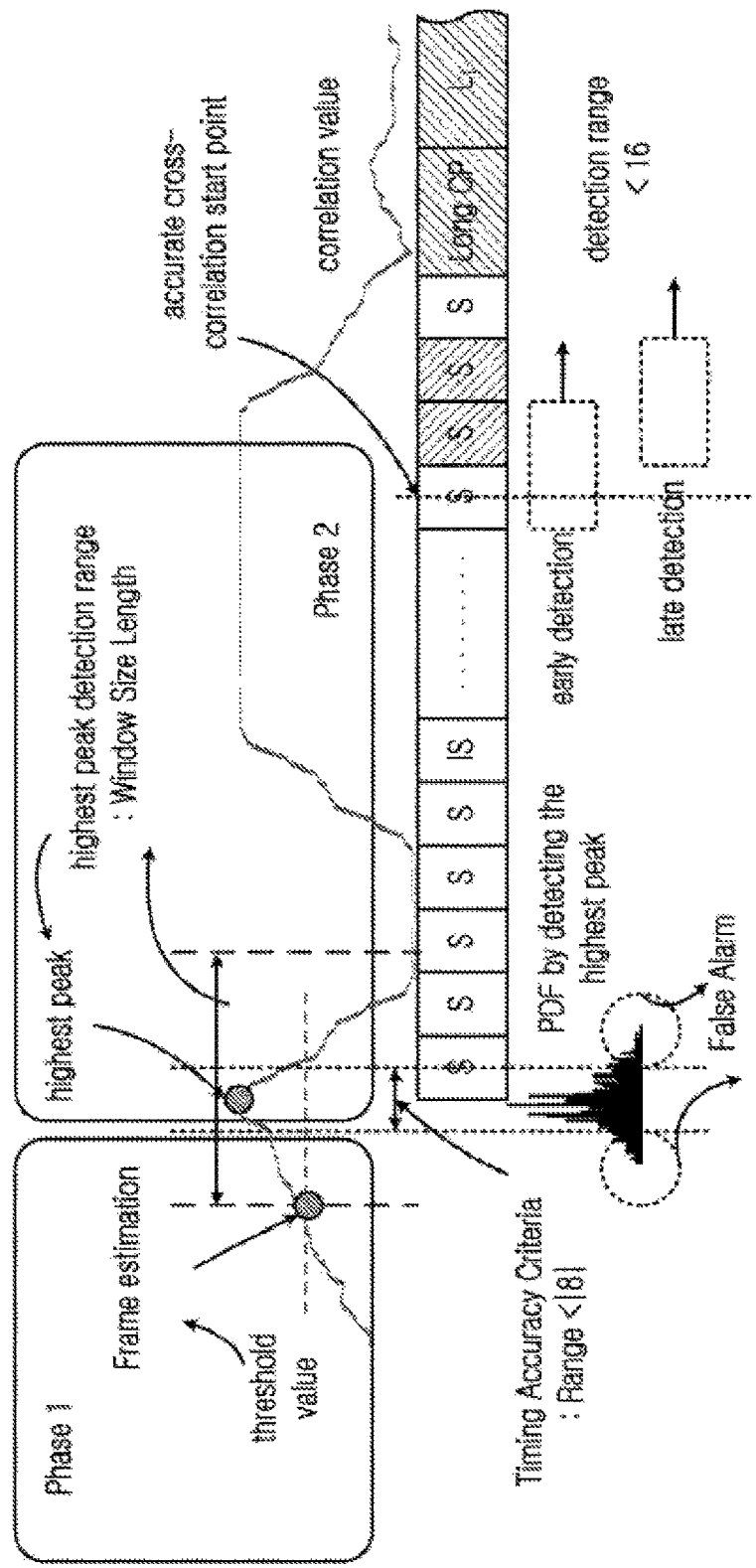
FIG. 15 depicts the frame synchronization including a timing estimation process to increase timing accuracy according to the embodiment of the present invention.

FIG. 15 illustrates that the symbol timing estimation process is added to the frame synchronization process in order to improve timing accuracy, the frame synchronization having periodically repeated signals for radio data communication.

To find the highest peak in the auto-correlation, the auto-correlation must produce a sharp peak by way of inserting the IS symbol in an appropriate location in the short preamble. For example, the $6^{th}$ S symbol in the current short preamble of FIG. 15 must be replaced with the IS symbol in consideration of the window length of 64 samples and an interval between each of the windows of 16 samples.

However, when window lengths for the auto-correlation are set to be the same, the above-described method may cause performance degradation since the probability of DF is increased because of reduction of the peak in the preamble period compared to the peak of the first method, and the probability of FA is also increased due to an offset of the timing accuracy. However, the method advantageously reduces the calculation amount in the fine symbol timing estimation.

The first method is simulated in the Additive White Gaussian Noise (AWGN), LOS (Line of Sight), and NLOS (Non-Line of Sight) channel models, and a signal-to-noise ratio (SNR) is set to be 5 dB and 10 dB, the size of a frame is set to be 200 symbols, and no clipping has been made.

Figure 16:
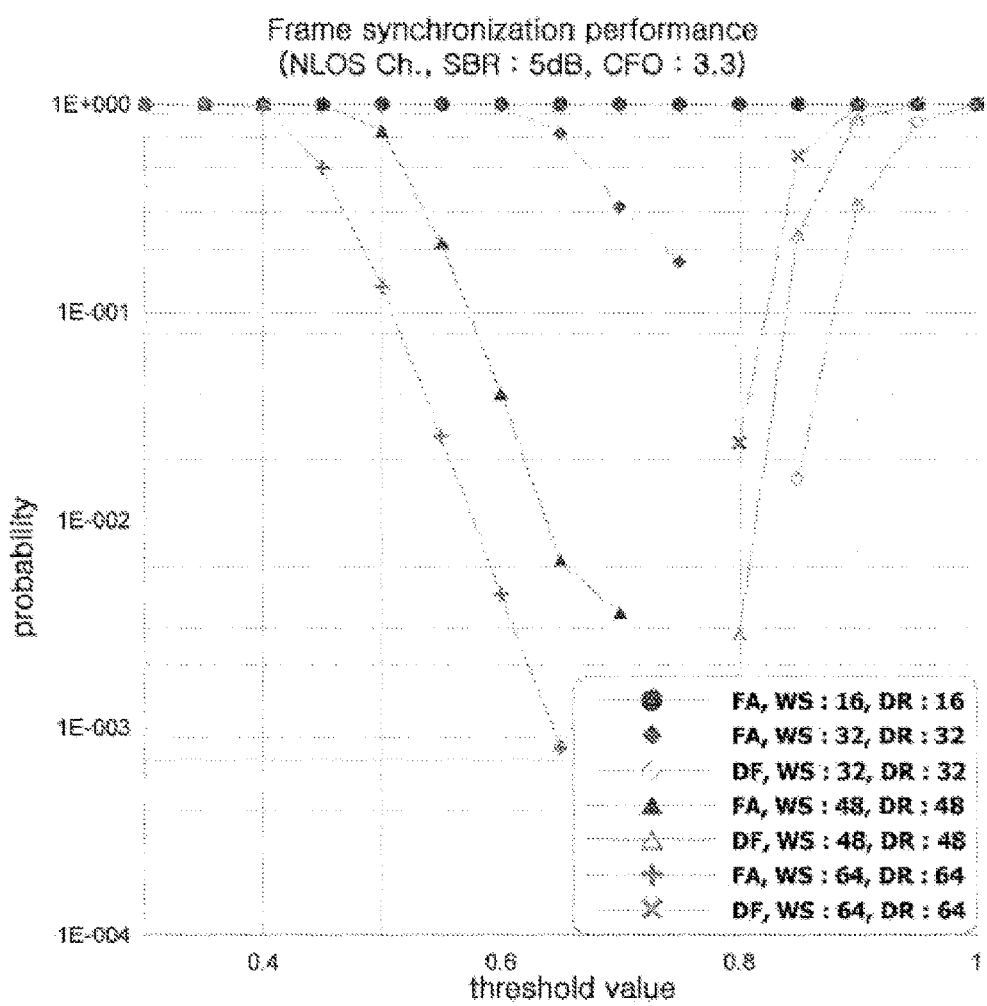
FIG. 16 depicts a simulation result for determining the length of a window in consideration of the amount of calculation during the frame synchronization performance and fine symbol timing estimation according to the embodiment of the present invention

FIG. 16 illustrates a simulation result for determining the window length in consideration of a calculation amount in the frame synchronization and the fine symbol timing estimation according to the exemplary embodiment of the present invention. Herein, the detection range is given to be ±|window size/2|, and the simulation is performed in the NLOS channel model.

Figure 17:
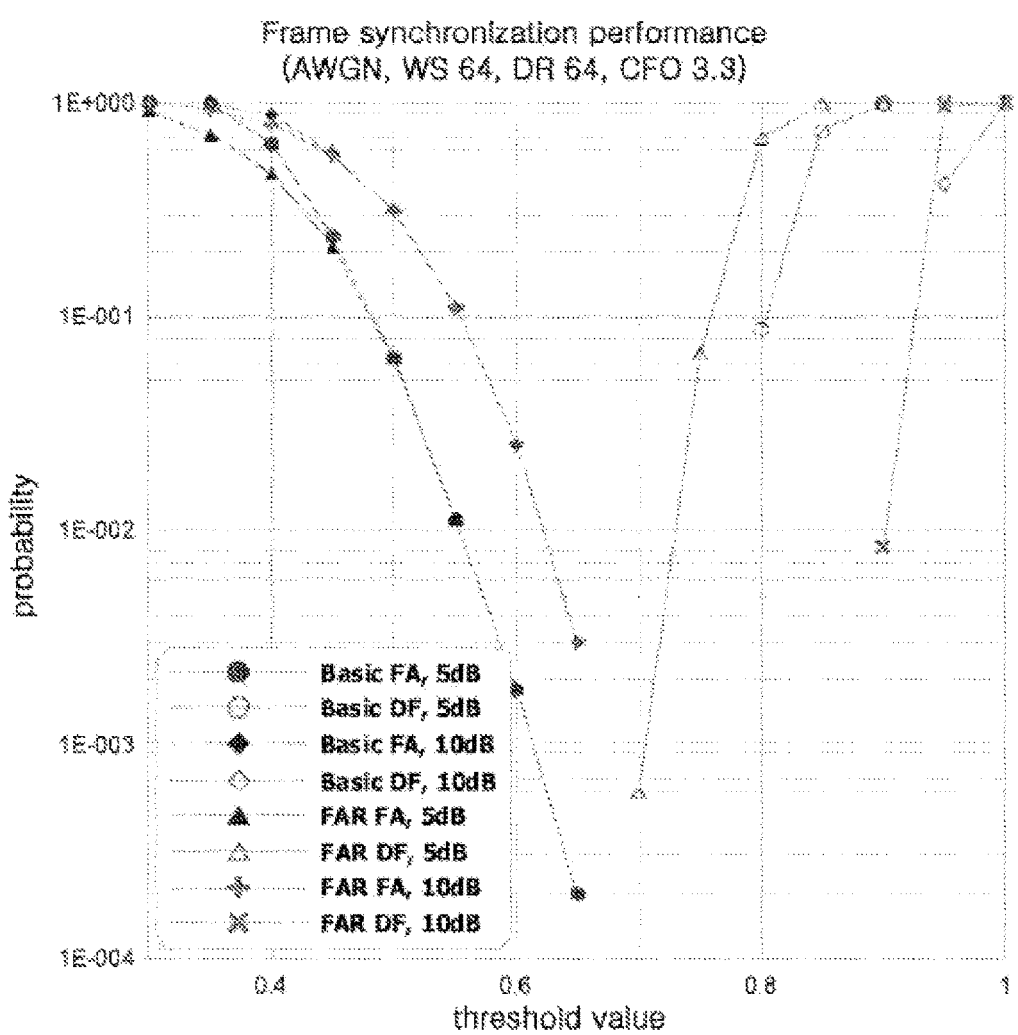
FIG. 17 to FIG. 19 depict results of channel-specified frame synchronization performance when the length of a window is set to be 64 samples, and a detection range is set to be 64 (±32) samples according to the embodiment of the present invention.
Figure 18:
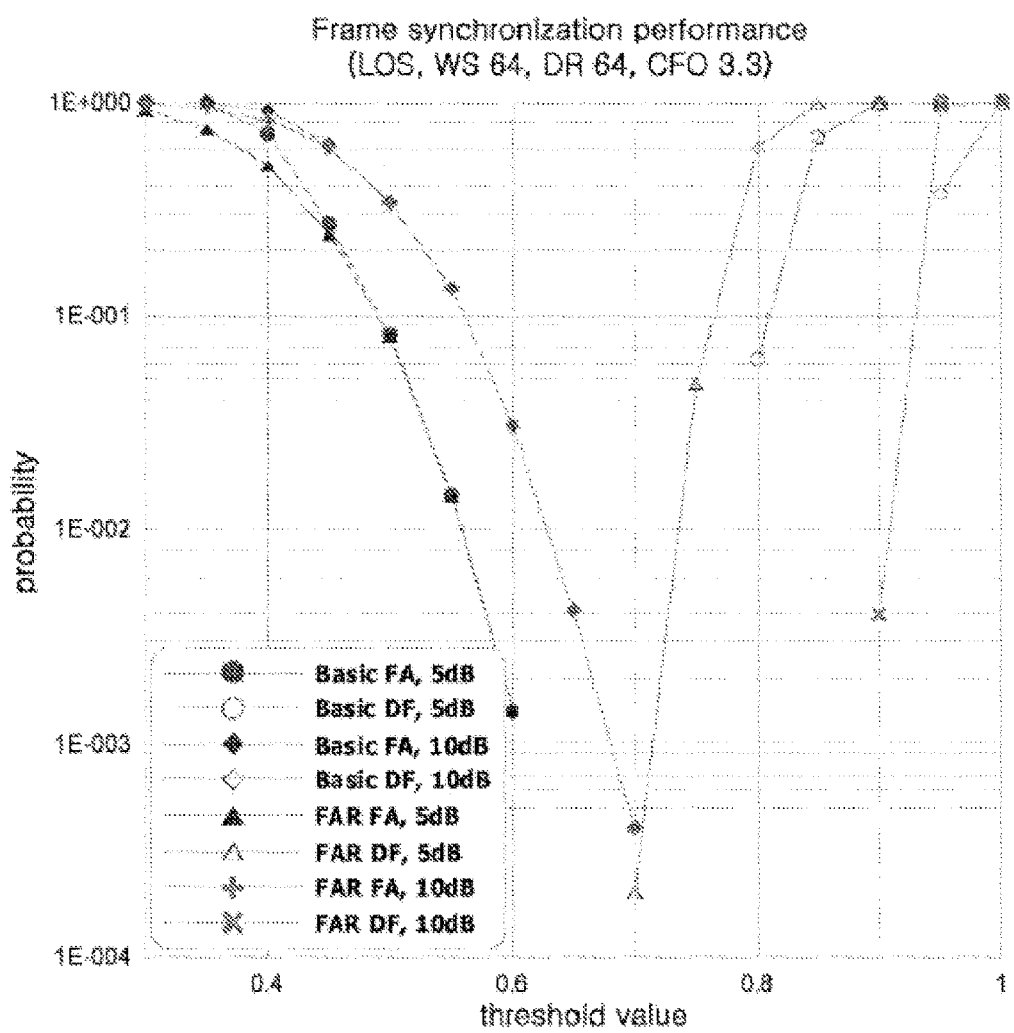
Figure 19:
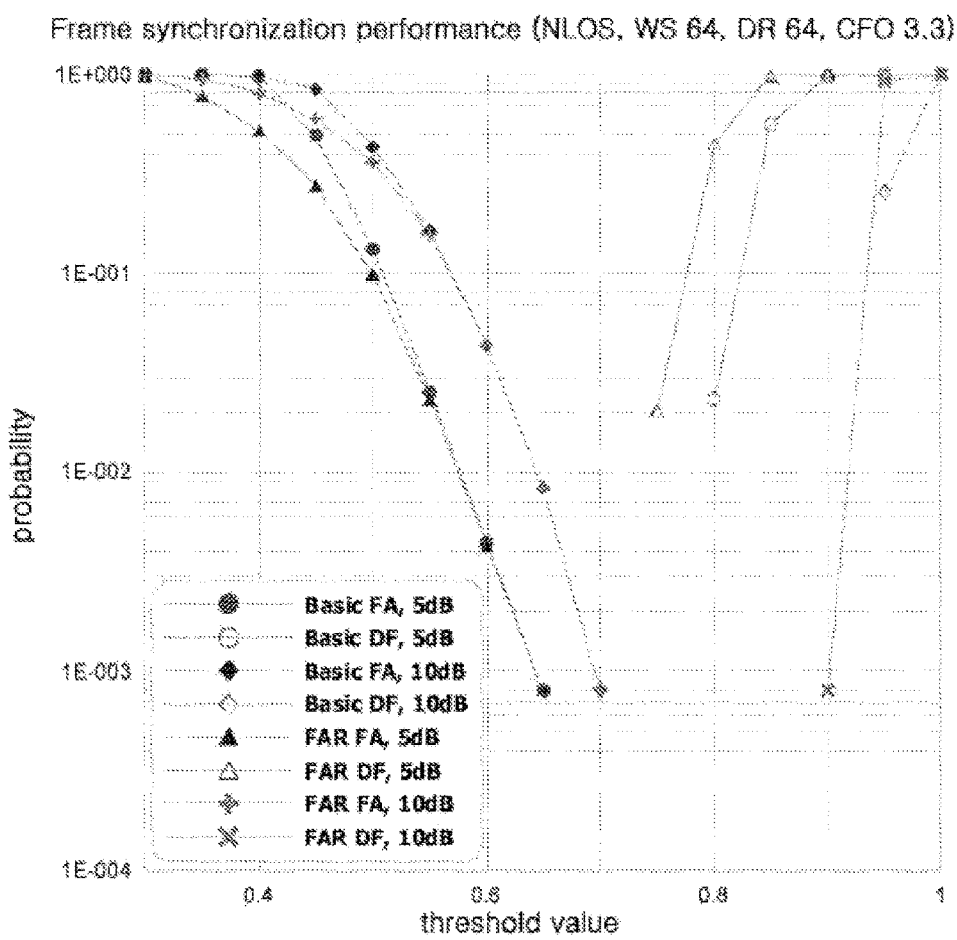

FIG. 17 to FIG. 19 illustrate a result of channel-specified frame synchronization performance when the window length is set to be 64 samples and the detection range is set to be 64 (±32) samples according to the present invention. Herein, 'FAR' denotes a confirmation process is included to the channel-specified frame synchronization performance to reduce the probability of FA, and the second method is analyzed as a frame synchronization algorithm for enhancing timing accuracy.

Figure 20:
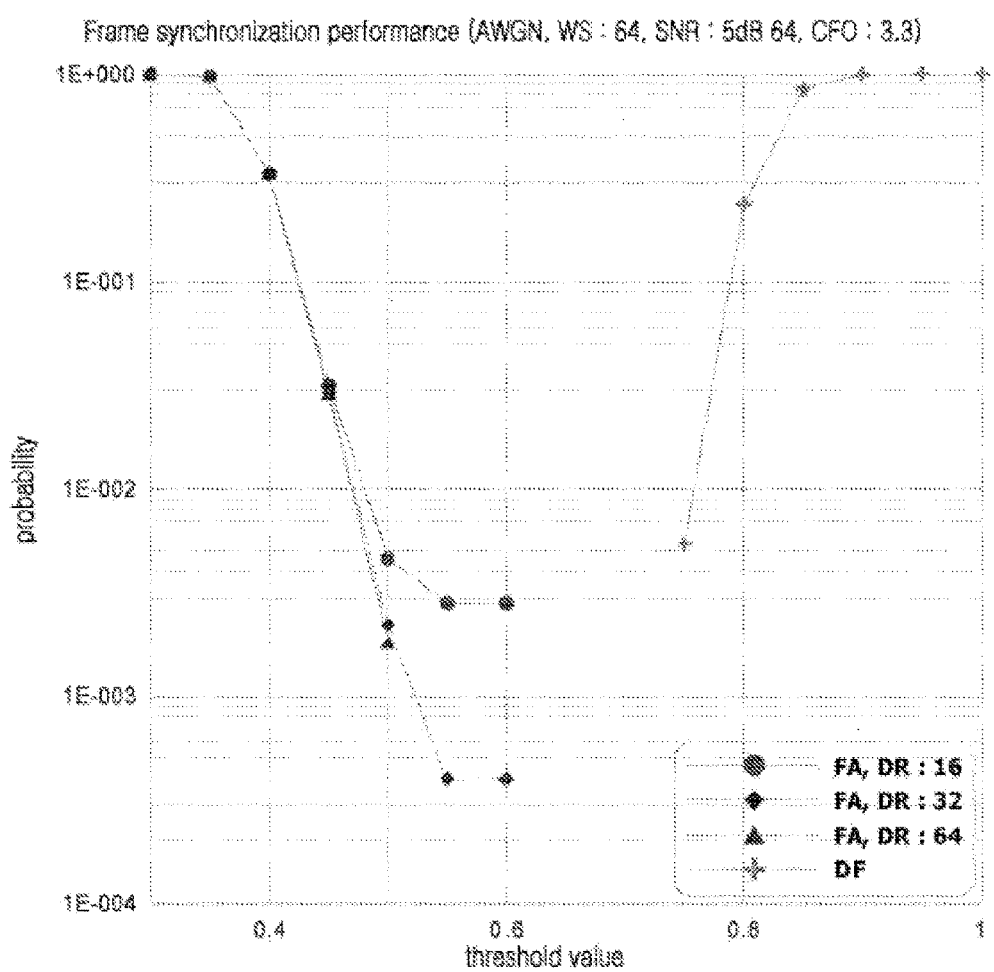
FIG. 20 to FIG. 22 depict results of a frame synchronization algorithm when the length of an auto-correlation window is set to be 64 samples and the detection ranges are respectively set to be 16 samples, 32 samples, and 64 samples for the timing estimation process included in the frame synchronization process.
Figure 21:
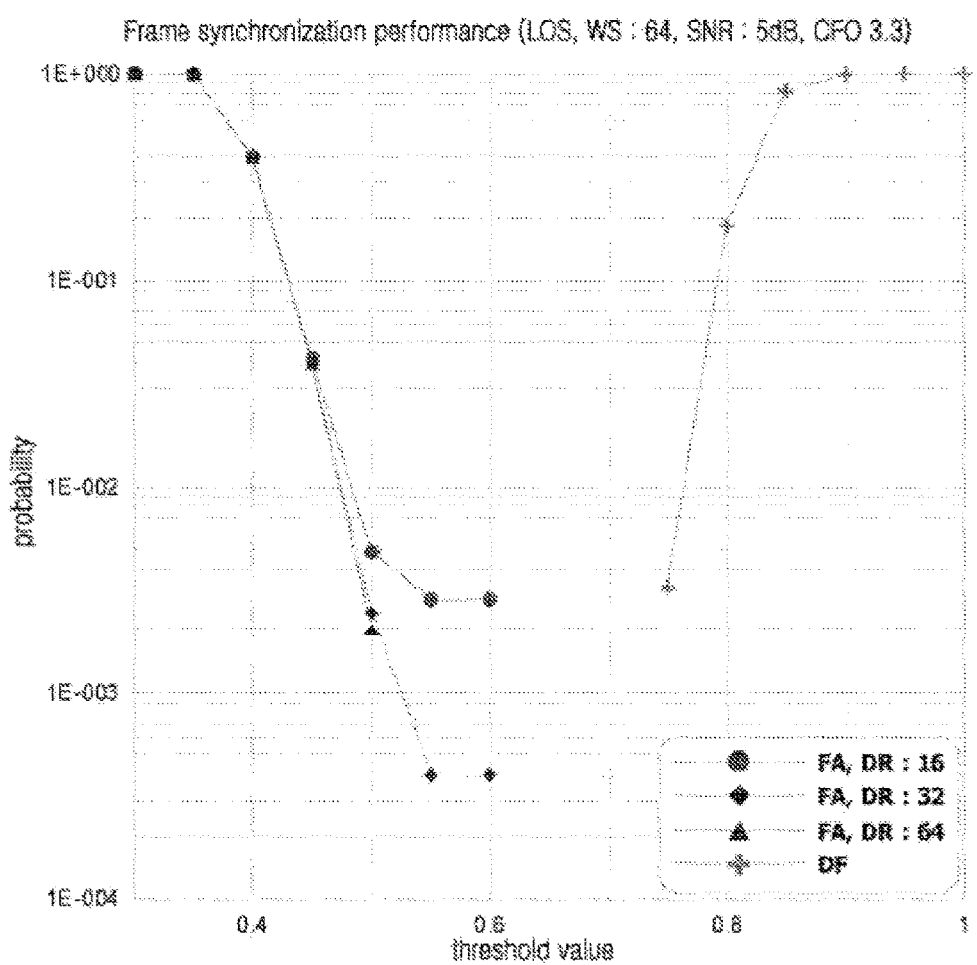
Figure 22:
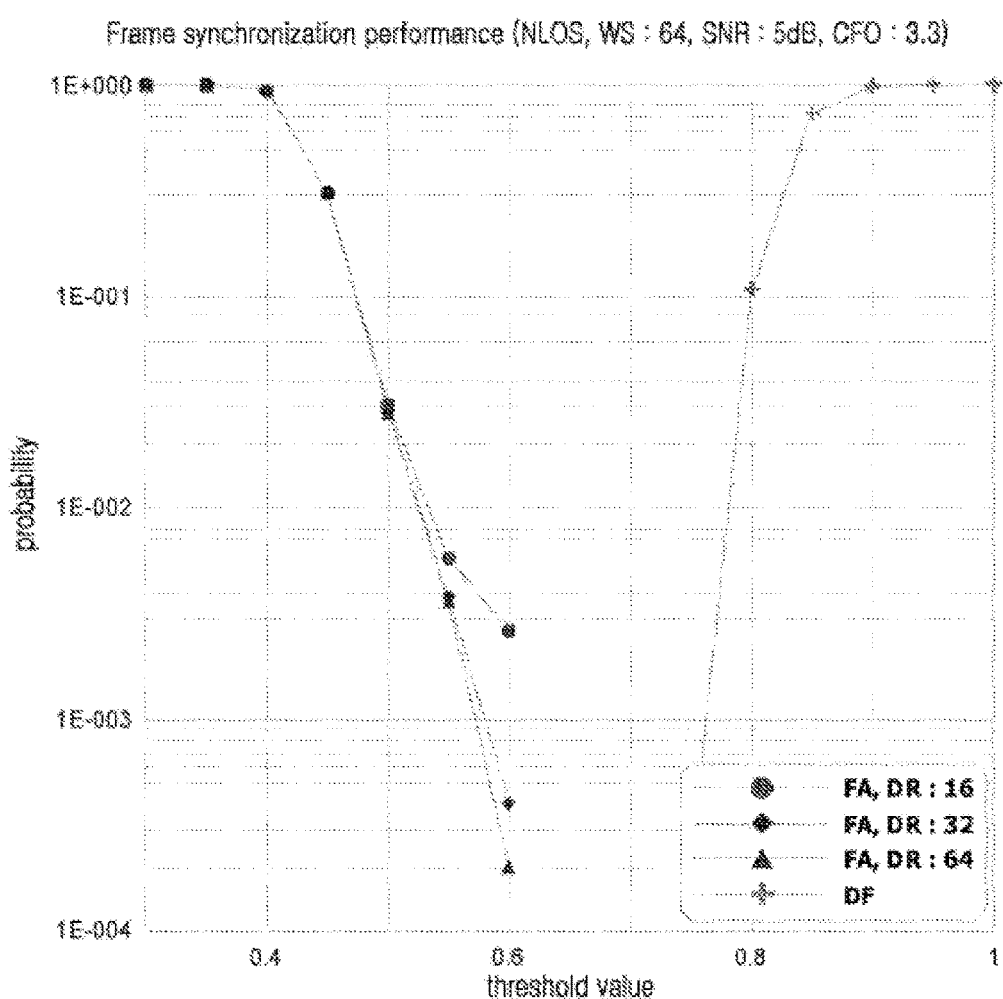

FIG. 20 to FIG. 22 illustrate a result of the frame synchronization algorithm when the auto-correlation window length is set to be 64 samples, the detection ranges are respectively set to be 16, 32, and 62 samples in the second method.

FIG. 23 shows a table comparing the frame synchronization using the algorithm according to the first method and the frame synchronization within 16 samples as the detection range according to the second method when the SNR is set to be 5 dB in both cases.

As shown in FIG. 23, a result of the comparison shows that the probability of DF is the same in both cases, and the probability of FA is greater in the second method. However, a calculation amount in the fine symbol detection of the second method is four times less than that of the first method.

FIG. 24 shows a table comparing the frame synchronization using the algorithm according to the first method and the frame synchronization within 64 samples as the detection range according to the second method when the SNR is set to be 5 dB in both cases. In this comparison, the probability of FA is lower in the second method, but it is preferred to consider a method for expanding the detection range of the first method.

According to the present invention, the start point of each frame is detected when a data frame/packet is transmitted/received in the 60 GHz WLAN system to thereby obtain high credibility when a receiver demodulates a signal, and increase capacity of the 60 GHz WLAN system.

In addition, according to the present invention, implementation of the 60 GHz WLAN system is less complicated and the cost for manufacturing an integral circuit IC is reduced. Further, when the present invention is applied to a wireless terminal which is sensitive to power consumption, the wireless terminal can be used without recharging it for a comparatively longer time.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A method to configure a frame in a wireless local area network system, the method comprising:
   arranging a short preamble used for synchronization in a receiver at a starting point of a burst, wherein arranging the short preamble comprises:
   arranging S symbols at the starting point, and
   arranging an IS symbol after the S symbols, wherein the IS symbol has the same length as the S symbol and is 180°-phased with respect to the S symbol; and
   arranging a channel estimation preamble used for channel estimation in the receiver after the short preamble,
   wherein an S symbol of the S symbols is repeated 16 times.

2. An apparatus for configuring a frame in a wireless local area network system, the apparatus comprising:
   one or more processors that arrange a short preamble used for synchronization in a receiver at a starting point of a burst, and arrange a channel estimation preamble used for channel estimation in the receiver after the short preamble,
   wherein the one or more processors arrange the short preamble by arranging S symbols at the starting point and arranging an IS symbol after the S symbols, wherein the IS symbol has the same length as the S symbol and is 180°-phased with respect to the S symbol, and wherein an S symbol of the S symbols is repeated 16 times.

* * * * *